Aug. 5, 1969     W. E. LERWILL ETAL     3,459,930
METHODS AND APPARATUS FOR THE CORRELATION OF TWO VARIABLES
Original Filed April 30, 1962
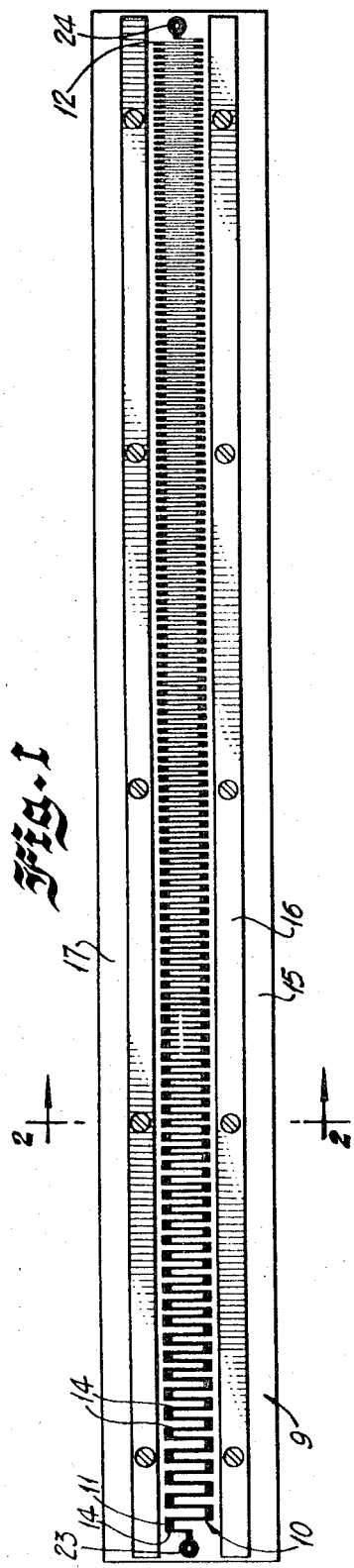
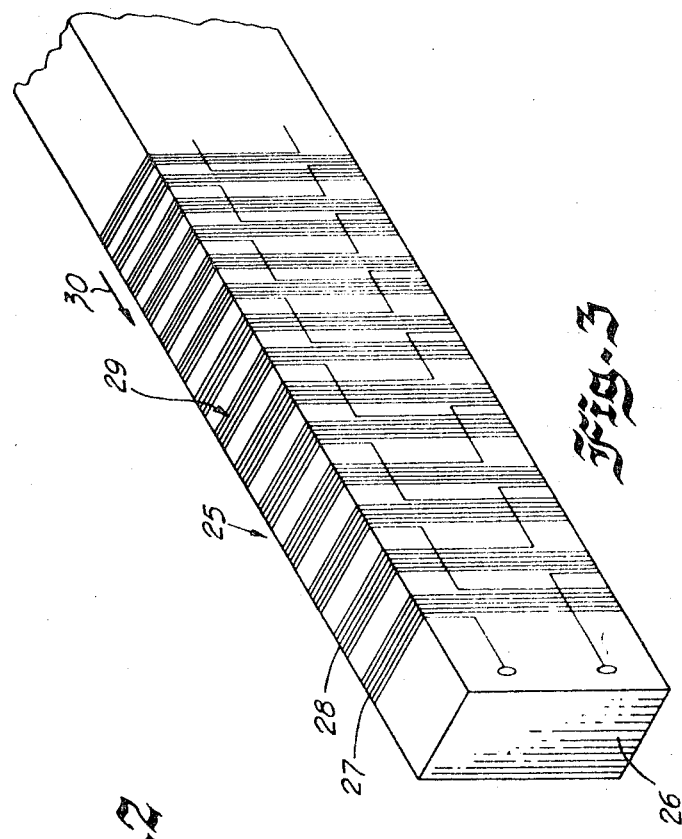
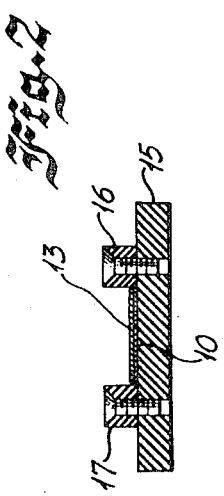
INVENTORS
WILLIAM E. LERWILL
AND NIGEL A. ANSTEY
BY
Mason, Kolehmainen, Rathburn + Wyss
ATTORNEYS

United States Patent Office 3,459,930
Patented Aug. 5, 1969

3,459,930
METHODS AND APPARATUS FOR THE CORRELATION OF TWO VARIABLES
William E. Lerwill, Keston, and Nigel Allister Anstey, Orpington, England, assignors to Seismograph Service Corporation, Tulsa, Okla.
Continuation of application Ser. No. 190,912, Apr. 30, 1962, now abandoned. This application Feb. 10, 1966, Ser. No. 526,596
Claims priority, application Great Britain, May 8, 1961, 16,687/61
Int. Cl. G06f *15/34;* G06g *7/19*
U.S. Cl. 235—181                                36 Claims

ABSTRACT OF THE DISCLOSURE

A first variable is recorded upon a magnetizable medium so as to produce a magnetic field having a spatial distribution corresponding to the variable. A detector is then constructed which includes a plurality of individual detecting elements whose spacing and sensitivity is adjusted to represent a second variable. The signals generated by the individual detecting elements are combined to form a correlation signal. When the magnetizable medium is passed over the detector, the variations in the correlation signal with respect to time is the correlation function of the two variables.

This invention relates generally to the correlation of variables and is more particularly concerned with a method and apparatus for quickly and expeditiously cross-correlating two variables. This application is a continuation of U.S. application Ser. No. 190,912, filed Apr. 30, 1962, now abandoned, by the inventors of the present application.

In recent years, cross-correlation has become a powerful tool in many branches of science and technology, and the present invention has application in many of them. In order to stress the breadth of the application of the invention, some of these uses are itemized below.

(1) The problem of the detection of a signal in the presence of noise is shared by all branches of communications and echo-ranging such as radar, marine echo-ranging, flaw detection in solid materials, for example, by ultrasonics, and seismic exploration. In those many cases where the characteristics of the desired signal are known and the noise may be taken as "white" and Gaussian, it is known that the filter which optimizes the signal-to-noise ratio is the so-called "matched" filter, whose frequency-transfer function is the complex conjugate of the Fourier spectrum of the desired signal. It is also known that the process of cross-correlating the combination of noise and signal against the desired signal itself is equivalent to a matched filter (see, for instance, Jones and Morrison, "Cross-Correlation Filtering," Geophysics, vol. 19, pp. 660–683).

(2) A particular case of matched filtering arises in pulse-compressive communication and echo-ranging systems. In one group of these systems, the transmitted signal is swept-frequency quasi-sinusoid having many cycles of oscillation and this signal is time-compressed, after reception, in a dispersive waveguide or all-pass electric filter. Such systems are described by Huttmann (German Patent No. 768,068, dated June 1955), Sproule and Hughes (British Patent No. 604,429, issued July 1948; U.S. Patent No. 2,463,328, issued March 1949), Dicke (U.S. Patent No. 2,624,876, issued January 1953), Darlington (U.S. Patent No. 2,678,997, issued May 1954) and Cauer (German Patent No. 892,772, issued April 1954). It is known that the dispersive pulse-compressors described by these authors do not in themselves represent true matched filtering, though the performance can be improved by the addition of supplementary amplitude-frequency filtering. It is also known that true matched filtering, obtained, for example, by cross-correlation, is the most desirable type of pulse-compression apparatus (see, for instance, Klauder, Price, Darlington and Albersheim, "The Theory and Design of Chirp Radars," Bell System Technical Journal, July 1960, pp. 745–808). A second group of pulse-compressive echo-ranging systems also transmits a swept-frequency signal, but the time-compression after reception is effected directly by cross-correlation without reference to matched filter theory. An application of such a system to seismic exploration (which application will hereinafter be termed the "Vibroseis" method) is described in U.S. Patents 2,688,124 (Aug. 31, 1954), 2,808,577 (Oct. 1, 1957), 2,874,795 (Feb. 24, 1959), 2,910,134 (Oct. 27, 1959) and 2,981,928 (Apr. 25, 1961). A third group of pulse-compressive echo-ranging systems uses a random or pseudo-random signal in place of the swept-frequency transmission. In this case also the compression is best effected by cross-correlation (see, for instance, Fishbein and Rittenbach, "Correlation Radar Using Pseudo-Random Modulation," USASRDL report, 1961). Although much of the ensuing description will be devoted to the "Vibroseis" system, it is to be understood that the correlation method and apparatus of the present invention are applicable to other pulse-compressive systems of communication and echo-ranging.

(3) Another expression of the matched filter concept is the ability of the cross-correlation process to provide pattern recognition. Thus, cross-correlation by the method described in this application can be used for the analysis of meteorological observations, market trends and similar functions for which an interrelation or periodicity exists but is not obvious to the eye. It can also be used for pattern recognition in various forms of coding. Two cases of pattern recognition which are of particular interest are the automatic recognition of speech and the automatic identification of earthquakes.

(4) A related application of cross-correlation allows the determination of the travel-time of a complicated disturbance between two points spaced apart either in the earth or by atmosphere. The disturbance in this case may be, for instance, microseisms, or sound waves from impacts or explosions, or random noise. If the velocity of wave transmission is known, the determination of the travel-time between two points (for instance, by a correlation technique) permits construction of a direction-finding system, as is well known in the art.

(5) The cross-correlation process also represents an excellent filter of general utility. Thus, cross-correlation against many cycles of a sine wave represents a peaked filter whose bandwidth is approximately inversely proportional to the duration of the sine wave sample, with the result that very narrow bandwidths are possible. Such a filtering method has many applications in vibration analysis, continuous wave echo-ranging, F-M radar and communication techniques generally.

(6) Cross correlation is also of value in the determination of system transfer characteristics. This is based on the Wiener-Lee relation.

$$\phi_{\text{gr.}}(\tau) = \int_{-\infty}^{\infty} h(t) \cdot \phi_{\text{gg.}}(\tau-t)dt$$

where $h(t)$ is the system weighting function, $\phi_{\text{gg}}$ is the auto-correlation of the input and $\phi_{\text{gr}}$ is the cross-correlation of input and output.

The above list of applications of cross-correlation is not intended to limit the scope of the present invention, but merely to illustrate the wide range of the technological fields involved.

Various methods of evaluating the cross-correlation function are known in the prior art. The correlating method and apparatus of the present invention will now be considered with particular reference to the system of seismic exploration known as the "Vibroseis" system and covered by the aforementioned U.S. patents. In the "Vibroseis" system of seismic exploration, large vibrators on the surface of the earth transmit into the earth a known, accurately controlled swept-frequency signal as an elastic wave. This signal is reflected at each of the many acoustic interfaces and gradients in the body of the earth, and the surface of the earth at some distance from the vibrator then moves in accordance with the superimposition of all these reflections. These movements are detected and recorded and the resulting records are cross-correlated with the transmitted signal to obtain reflection records of the usual type. This technique, therefore, differs from the conventional pulse systems wherein explosive charges or a weight drop are used to generate the elastic waves, first in the transmission of a swept-frequency signal of long duration as opposed to a short one and, second, in the cross-correlation of the received signal against the transmitted signal.

Various methods are known for correlating the received signal and the transmitted signal. For example, the method of correlation described in U.S. Patent Nos. 2,688,124; 2,808,577 and 2,874,795 relies upon a multiplication and integration process to obtain the correlation function. More specifically, the received signal is multiplied with a pattern wave representing the transmitted signal at each of several small increments of time from zero to the greatest reflection time of interest T. The result is a correlation function in the form $$K\int_0^T r(t) \cdot g(t+\tau) dt$$

where $g(t)$ and $r(t)$ are the generated and received signals, respectively, K is a constant, $\tau$ represents time variations from 0 to T during successive playback cycles and $\int dt$ represents integration with respect to time.

The correlation function may also be evaluated as a continuous function of $\tau$ by optical means, for example, by an apparatus like that disclosed in U.S. Patent No. 2,839,149 of R. G. Piety and assigned to Phillips Petroleum Company. A fairly complete summary of prior art may be found in "Experimental Correlograms and Fourier Transforms," by N. F. Barber, published by Pergamon Press in 1961.

Though both of the prior art correlators described above evaluate the correlation function satisfactorily, they both have marked practical or operational difficulties. The first is extremely slow in operation, and involves the use of a large amount of expensive equipment. The second involves a photographic process and requires very great care in the making and positioning of the photographic films. Because of these features, it has not been heretofore possible to assess the results of the seismic exploration in the field, since it has been necessary to install the correlating equipment only in a base or central office. This is a distinct disadvantage since it is desirable to be able to make the correlation in the field while the survey is in progress in order to enable the crew to determine whether additional records are necessary for an adequate evaluation. One object of the present invention is to overcome these operational disadvantages by providing a correlator which is small, compact and lightweight so that it may be used at a central office, if desired, or may be easily transported from place to place to permit use in the field.

Another object of the invention is to provide a new and improved correlator which is of simple construction and can be manufactured inexpensively.

A further object of the invention is to provide a method and apparatus for correlating two signals very rapidly and with minimum effort.

The invention also has for an object the provision of a method and apparatus for correlation without requiring the production of photographic films or records which are difficult to handle and process.

It is another object of the invention to provide a method and apparatus for correlating signals played back from a magnetic tape or the like during the playback and without requiring conversion of the reproduced signals into records of another form.

It is a further object of the invention to provide a method and apparatus for obtaining a running cross-correlation by processing the data only once and, at the same time, making the results available almost instantaneously.

The foregoing and other objects are realized, in accordance with the present invention, by a method employing the following steps:

(1) One of the variables, $r(t)$, must first be expressed as variations in an energy field as a function of distance. In some cases the variable $r(t)$ will already exist in this form (e.g., in the direct cross-correlation of the incident radio waves), but where this is not so (e.g., where the variable exists—as is often the case—as a voltage which is a function of time) it is necessary first to convert this so that it becomes a variation of some suitable energy field as a function of distance. Suitable forms of energy field are elastic, pressure, magnetic, electric, electromagnetic and radioactive. In all suitable conversions, the result is a spatial distribution or pattern of some detectable energy field. As an example, this may be effected by using the original voltage-time signal to energize a magnetic recording head across which is passing a suitable magnetic recording medium at a predetermined velocity or rate-of-change of velocity. In this way the voltage-time signal is translated into a pattern of variations in magnetic intensity as a function of distance. Alternatively, the original voltage-time signal may be used to drive a current through the launching transducer of a torsional or other delay line, so that it is translated into a pattern of variations in strain as a function of distance. Alternatively again, the original voltage-time signal may be translated into a pattern of pressure variations in an elastic substance or a pattern of electromagnetic waves in a dielectric. In general, the first variable or the translation thereof into another form is a spatial distribution or pattern of some detectable property or state.

(2) The second variable $g(t)$ is then expressed as a spatial distribution or pattern of the sensitivity of appropriate detecting means, using the same relationship between distance and time as was employed in the first step. A continous detector may be employed having a sensitivity (as a function of distance along it) programmed to conform to the variable $g(t)$ or, in the alternative, a plurality of elementary detectors or separate detecting elements may be used each contributing an output programmed in the same way. Each elementary detector, or each element of the continuous detector, then contributes an output which represents the product of its own sensitivity and the magnitude of the property or state which it is detecting.

(3) In the case of a plurality of elementary detectors, the outputs are combined (for instance, by connecting these elements in series) so that the overall action approximates that of a continuous detector. The overall output is the integral of the outputs of the detecting elements over the total length of the detecting pattern.

The output of the detecting pattern as the first variable $r(t)$ passes over it, in original or translated form, is the running cross-correlation function $\phi_{gr}(\tau)$, where $\tau$ is a measure of the relative positions in space of the signal corresponding to $r(t)$ and the detector pattern corresponding to $g(t)$.

The invention, both as to orginization and manner or operation, together with further objects and advantages thereof, will best be understood by reference to the following detailed description taken in conjunction with the accompanying drawings, wherein:

FIG. 1 is a top plan view of one form of detector which may be used in the practice of the present invention;

FIG. 2 is a sectional view taken along a line corresponding substantially to the line 2—2 of FIG. 1; and FIG. 3 is a perspective view illustrating another form of detector which may be used in the practice of the invention.

The method and apparatus of the present invention will be described herein with reference to the linear swept-frequency control signal often used in "Vibroseis" exploration of the type described in U.S. Patent Nos. 2,688,124; 2,808,577 and 2,874,795 referred to above, although, as was previously indicated, the invention is not limited to this particular field. The vibrator in such an exploration system may, for example, emit a swept-frequency signal ranging from 20 cycles per second to 80 cycles per second in six seconds so that this signal contains 300 full cycles and 600 half cycles. If this swept-frequency were recorded directly on a magnetic tape or the like at a tape speed of 3.75 inches per second, the first cycle would be approximately 0.1875 inch long, the last cycle would be approximately 0.0469 inch long, and the total signal would occupy approximately 22.5 inches. If a narrow conducting strip were laid across the tape perpendicular to the longitudinal axis of the tape transport, a voltage would be induced between the ends of the strip having a sense and magnitude which is a function of the direction and degree of magnetization and of the effective frequency of the tape area adjacent the strip. By moving the tape past the strip, a voltage would be induced varying in accordance with these factors.

A detector 9 may be formed by providing a strip of conducting metal having the form of a square wave as indicated at 10 in FIG. 1. The square wave formed by the strip 10 has a peak-to-peak amplitude compariable to the width of the magnetized track, a first cycle 11 with a length of approximately 0.1875 inch corresponding to the length of the first cycle of the swept-frequency on the tape, and a last cycle 12 with a length of approximately 0.0469 inch corresponding to the length of the last cycle of the swept-frequency on the tape. For clarity, FIG. 1 illustrates a signal sweeping from 20 to 80 cycles per second in only 3 seconds (that is, in 150 cycles). The linear extent of the strip is therefore approximately 11.25 inches, equal to the overall length of the corresponding swept-frequency signal on the tape. If, as is shown in FIG. 2, such a strip is laid adjacent a magnetized tape 13 having a track thereon of the type described above, then all of the voltages induced in the transversely extending portions 14 of the strip by the magnetized track will be effectively in series. The voltage output across the ends of the strip 10 at the position when the swept-frequency signal recorded on the tape exactly corresponds to the configuration of the strip will be large, whereas at all other positions it will be small. Thus, a record or curve of the voltage appearing across the ends of the strip 10 as the tape 13 is moved past the strip would appear as a pulse, generated as the tape passes through the position of overlay or direct correspondence. This pulse, for the case quoted, is an auto-correlation pulse modified by the normal processes of magnetic induction.

The thickness of the transversely extending portions 14 of the strip 10 (i.e., the dimension of these portions as measured in the direction of the tape transport) is subject to the same limitation as the gap length on a normal magnetic playback head. Thus, the thickness may be varied progressively to correspond to a certain fraction (for example, one third, one quarter or one fifth) of a wavelength, though the practice of the invention is not limited to such a vriation. The thickness of the transversely extending portions in the form shown in FIG. 1, where the frequency of the pattern wave or control signal is varied over two octave, thus varies from a relatively large amount at the left or low frequency end of the strip to a very thin line at the right or high frequency end.

The strip 10 is preferably manufactured by any of the well known printed circuit techniques as, for example, by using a laminated structure consisting of a copper clad insulating base, by coating the copper layer with an acid resisting material along an area corresponding to the strip 10 and by then etching the copper layer to remove all except the area coated with the acid resist. In this manner, the strip 10 is formed on an insulating support base 15. Guides may then be added to limit movement of the tape laterally while it travels over the strip. These guides may take any well known form, but, as illustrated in FIG. 1, they are in the form of bars 16 and 17 extending along opposed sides of the strip 10 and suitably secured to the base 15. Alternatively, the lateral contraint of the tape may be accomplished by grooved guide pulleys at the ends of the support base 15. The magnetic tape may be in the form of a loop, or may be fed from a supply reel to a take-up spool via any conventional tape drive mechanism. The tape may be held in contact with the strip 10 over the whole of a latter's length by conventional spring biased pressure pads and/or by curving of the base material 15 into a slight convex arc. Any such curvature should be taken into account during the preparation of the master for applying the acid resist to the copper layer, or during the original recording of the tape 13 by varying the recording speed. The base material 15 should be of good dimensional stability so that it does not vary appreciably in response to changes in temperature, humidity or other ambient conditions. The strip itself may be coated with a suitable hard material to reduce wear although this is not shown in the drawings.

The open-circuit output across the ends 23 and 24 of the strip 10 is the algebraic sum of the voltages developed in all of the transversely extending portions or individual detecting elements 14, and, in the case of the square wave described above, the detecting elements are the sides (rather than the tops and bottoms) of the square wave. The output of the strip 10 as the tape moves thereover is the cross-correlation of the recorded signal with the square wave pattern of the strip, as modified by the normal processes of magnetic induction. However, the form of the strip is not restricted to the square wave described above, since the azimuth of those portions of the strip which cross the tape may be varied, or such portions may be shaped to yield cross-correlation of the recorded signal with other desired waveforms. As a particular example, the strip may take a substantially sinusoidal form, with or without the change of thickness described above.

It is evident that this printed-circuit type of correlating playback head represents a convenient and inexpensive method of correlating with a known waveform. The master used for applying the acid resist may be made by plotting out computed values or by the manipulation of waveforms recorded on suitable oscillographs. Thereafter any number of duplicate heads may be produced inexpensively and rapidly.

A second method of forming the conducting strip may be employed where the delay involved in making a printed circuit is not tolerable. According to this method, the function $g(t)$ is drawn at suitable amplitude and time scales, on semi-absorbent base material, by a standard pen motor or jet galvanometer using conducting ink. The resulting plot, after the addition of inked-in electrical connections to the conducting trace, may then be used as a reproducing head in the same manners as the printed circuit version.

In the printed-circuit form of the invention as described above, the voltages corresponding to all half cycles of the waveform are in series, by virtue of the continuous nature of the strip. It is also feasible to connect alternate elements in parallel to obtain a high current, low voltage output at the point of correlation, but in the case of the printed-circuit strip, the parallel connections must be made through the base material.

A second form of the playback head is indicated by the reference numeral 25 in FIG. 3 wherein the base material of the printed circuit is replaced by a long insulated former 26 (for example, an insulating block 24 inches long and ½ inch by ¼ inch rectangular in section) while the metal strip is replaced by two windings 27 and 28 of fine insulated wire. One winding 27 has one small group of one or more turns for each positive half cycle of the control or pattern waveform (or example, 300 groups in all) and the other winding 28 has a similar group of turns for each negative half cycle. The centers of the groups are spaced from each other in accordance with the spacings between the transverse portions 14 in the square wave printed circuit described above and the widths of the groups (i.e., the number of turns per group) may be progessively varied, if desired, to accomplish the same results as the variation in thickness of the strip 10 as described above. Each winding progresses from one end of the former to the other, but the second winding 28 is either wound in the opposite sense to the first winding 27 or is connected electrically in series with the first winding in such manner that the voltages induced by the positive half cycles of the magnetic field in one winding reinforce or add to those induced by the negative half cycles in the other. After winding, the turns are fixed in place (for example, by coating with an epoxy resin) to form a smooth face on one side 29 of the insulating former 26 to provide for intimate contact with the magnetic tape which is adapted to pass along the face in the direction indicated by the arrow painted line 30. As before, the bearing face 29 of the playback head may be coated with a hard material to reduce wear.

It is evident that the action of this second type of head is similar to that of the printed-circuit type, in that one group of turns of the wound head 24 corresponds to one transverse portion or detecting element 14 of the strip 10 in the printed-circuit head. If the printed-circuit head has a strip thickness which varies progressively with frequency as shown in FIG. 1, however, the equivalence is not exact, since the corresponding wound head where the number of turns per group varies progressively with frequency possesses some advantages. More specifically, if the wound head has more turns per group at the low frequencies, it is able to compensate, at least in part, for the normal low-frequency loss of the direct magnetic playback process.

If this improvement in the low-frequency sensitivity is not to be made in a few coarse increments, it is desirable that many turns of fine wire should be used (at least, in the low-frequency sections of the head). Thus, FIG. 3, which shows a swept-frequency head with six turns per group at the low-frequency end, is illustrative only.

As described above, the function against which the recorded signal is cross-correlated may be a square wave, a sine wave, or any other suitable waveform. In the printed-circuit head this is effected by appropriate variation in the shape of the strip 10 while in the would head case it may be effected by grading the spacing of the turns within each group and by varying the angle at which the turns cross the tape.

If the swept-frequency signal recorded on the tape 13 contains 600 half cycles as described above, the strip 10 contains 600 transverse detecting elements and the head 24 contains a similar number of groups of turns. Although the electrical output from one detecting element 14 of the strip 10 or from one group of turns of the head 24 may be very small, the combined voltage induced in all 600 is well suited to normal amplifying equipment.

A major operational advantage of both of the described forms of the correlator is that no critical adjustment of amplitude or alignment of trace axes is necessary. The signal to be cross-correlated may be recorded on the tape with no more than the usual attention to its amplitude level, and the transverse dimension of the long playback head may be made slightly less than the width of the magnetized track to allow for a mechanical tolerance in the tape guides. In the case of the printed-circuit heads, the transverse dimension of the head may alternatively be greater than the width of the track and, if desired, the transverse dimensions of the head and track may be selected to produce cross-correlation with clipped waveforms.

Normally, a standard drive system can be used employing a synchronous motor controlled from a frequency standard but, in the event that more precise regulation is required, a servo-controlled speed correction system may be used. This may make use of an error signal derived, for instance, from the phase comparison of the outputs of two conventional playback heads mounted over a timing track recorded side-by-side with the signal track.

For some purposes it may be desirable to effect frequency-selective filtering within the band of frequencies covered by the swept-frequency signal. This may be done in a simple manner merely by lifting the tape away from the long playback head over a part of the latter's length or by inserting a magnetic shield between the tape and the detector head over a portion of the length. In this way the effect of high-pass, low-pass, band-pass and bandstop filtering can be very quickly tested. Alternatively, the desired attenuation characteristic may be designed into the playback head or detecting means itself. In the case of the printed-circuit head, for instance, this is accomplished by variation with frequency of the amplitude of the square, sine or other waveform described by the printed-circuit strip, while in the wound head type detector it may be accomplished by similar means or by varying with frequency the number of turns per group. Thus, heads can be designed which have any desired frequency-selective characteristic within the band of frequencies covered by the sweep.

It is important to note that this frequency-selective filtering is achieved without any phase shift of the components constituting the signal. Thus, this filtering is quite different in this respect from that normally applied in echo-ranging equipment and, although other methods of obtaining zero-phase-shift behavior are known in the art, none has the operational simplicity of the present invention.

The invention is not restricted to zero-phase-shift filtering since the linear distribution of the several detecting elements or groups may be modified from the form previously described and may be made to be equivalent to any desired variation of phase shift with frequency. This phase shift may be effected by shifting the position of particular detecting elements or groups, in the direction of tape transport for a lag and against the direction of tape transport for a lead. The phase shift can be introduced in the manner described with or without regard to the frequency response which, as was indicated above, may be controlled by adjustment of the relative sensitivities of the different detecting elements or groups. This is a highly important feature of this type of filtering.

An example where frequency-selective action should be combined with phase-shifting action is the equalization of the normal playback charateristics of direct magnetic recording, or what has been termed hereinbefore the normal processes of magnetic induction. Reference has been made to this previously in connection with the wound type of playback head, where the sensitivity at the low frequencies can be increased by supplementing the number of turns, and the phase lead at all frequencies can be compensated by appropriate positioning of all groups of turns. In the case of the printed-circuit type of head, the phase compensation can be obtained by the same means, and the frequency compensation may be obtained by decreasing at the high frequencies the amplitude of the waveform described by the strip. In seismic applications this rising frequency characteristic offsets the normal high frequency loss in the earth and, for this reason, the equalization of the characteristic may not be desirable. In other applications there is available a choice between equalizing in the strip and equalizing in the following amplifier and, when using the printed-circuit type detector, the latter procedure may be preferable in view of the improved signal-to-noise ratio which can be obtained.

The last four paragraphs are concerned with the provision of frequency-selective action within the band of frequencies covered by the control signal. The correlation process is a powerful tool for the attenuation of the frequencies outside this band, and this leads to the second major application of the invention as a frequency-selective filter of a particular type. More specifically, the band-width of the wavefrom represented by the correlator detector may be progressively reduced, until in the limit this waveform becomes sinusoidal. If the head then represents many cycles of this sinusoidal waveform, the device constitutes a very highly selective filter. Such a filter has important application in the interpretation of periodic phenomena, for example, in the analysis of the vibration of an aircraft engine or airframe. Transient phenomena such as earthquakes may also be frequency-analyzed in this way, provided that the transient is made recurrent in a suitable manner. A coarse variation of the filter peak frequency can be achieved by using a plurality of correlator detectors having different wavelengths, while a fine variation can be achieved by changing the tape speed.

This method of filtering has several advantages over methods known in the prior art. First, the playback head or correlation detector may represent several hundred cycles, so that the selectivity of the invention when used as a filter is very much greater than is obtainable, for instance, with customary inductance-capacity filters. Second, a filter, designed as explained above may be made to have a narrow but flat top (as well as steep sides) by sweeping the frequency of the waveform of the correlation detector between narrow limits. Third, across this flat top there is no relative phase shift. Fourth, for a sinusoidal correlation detector there is no phase shift between a small section of the filter and the complete unit, although obviously the outputs in these two cases represent a different time sample. Fifth, the addition of more filters to the basic equipment is inexpensive.

In summary, the playback head or correlation detector described represents a convenient and inexpensive method of correlating two variables, where one of these is recorded on magnetic tape and the other is built into the configuration of the detector. The invention has been described for applications where the second variable is either a swept-frequency or a sine waveform, but the invention is not restricted to these applications. Thus, for example, if it is desired to cross-correlate a reflection seismic record with a function derived from a log of acoustic impedances in the earth, this can be done by recording the seismic trace on magnetic tape and by constructing the playback head (conveniently by the printed-circuit technique) in the form of the said function. As is well known in the art, an approximation to the acoustic impedance log can be made by logging a borehole, and will show variations in velocity of acoustic signal pulses passing through the different earth layers. The correlation of the acoustic log with the seismic trace on the tape yields useful information on the form of the primary seismic pulse and on the significance of multiple reflections. The same technique is applicable to other types of echo-ranging where the spatial distribution and reflection coefficient of the reflectors is known as, for example, in navigation systems where reflection from known points is employed.

In such cases (and indeed in the swept-frequency case also) the correlation process can be used to recognize the existence of a pattern, even when this pattern is not visible to the eye. The use of correlation techniques to identify such patterns is well known but, although some of these studies lend themselves to solution by digital computers, others have suffered from the lack of an inexpensive and rapid method of analogue correlation. The present invention is applicable to many of these among which the following may be mentioned:

(a) The recognition of the patterns represented by vowel and consonant sounds in the speech of one individual, with or without suitable shaping, and the consequent use of many correlating playback heads (of the inexpensive printed-circuit type) to identify sounds and to affect automatic phonetic print-out of speech.

(b) The recognition of patterns of sounds, patterns of letters or patterns of words as an aid to automatic machine translation from one language to another.

(c) The recognition of patterns of sound in music.

(d) The recognition of patterns of letters, symbols, words or sounds in coded information.

(e) The search for hidden causative factors in the analysis of variables such as market sales, weather, microseisms, and statistics generally.

(f) The sorting and identification of all items which, by scanning techniques or otherwise, can be expressed as a time series as, for example, signatures, fingerprints and photographs. This feature becomes important when organizations wish to avail themselves of the major storage advantage of keeping all records on magnetic tape, and are then faced by the problem of finding particular information rapidly and automatically.

If the variables being correlated are not unique (or non-repetitive) the output from the correlating detector will in general include one or more subsidiary pulses in addition to the main pulse which indicates the position of overlay or correspondence. In some applications this is not important but in others the spacing, amplitude and duration of the subsidiary pulses may be determined by auto-correlation, and the main pulse may be used to reduce their amplitude in a manner similar to that described in U.S. Patent No. 2,450,352 (R. G. Piety, 1944). It is noted that this process may be effected, in part at least, by suitable variation in the form of the printed-circuit strip. Thus, the strip 10 may not follow the shape of the control signal alone, but may represent the superposition of the control signal upon one or more attenuated and time-shifted versions of itself. The point of true correlation or overlay will thus be more sharply defined. Even when the control signal is in fact non-repetitive (as in the swept-frequency signal often used in "Vibroseis" operation), this process may be used to reduce the time duration and oscillatory character of the auto-correlation pulse. This is important in any attempt to extract the maximum geological information from the seismic record.

Where magnetic recording is mentioned in the foregoing descriptions, it is understood to signify the conventional longitudinal method of recording. However, the invention is not restricted to this type of recording but may be modified to suit perpendicular recording. Further, the invention is not restricted to the case of direct magnetic recording, but is applicable also to amplitude-modulated, frequency modulated, pulse-width-modulated and other systems of recording.

In fact the method disclosed in this application provides for the cross-correlation of any two variables which can be expressed as functions of a dimension in space. Thus, the first variable may be an electromagnetic wave in space, in which case the second variable may be represented by the configuration of the detecting antennae or aerials. The first variable will induce a maximum signal in the detectors only when the detector array is aligned with the direction of travel of the wave at which time the spacing between the individual detectors of the array corresponds exactly to the spatial distribution of the wave. Thus, if the aerials or antennae are turned until a maximum response is obtained, the direction of the wave source is indicated and a direction-finding system results. The first variable may also be a pressure wave in a fluid, in which case the second variable is represented by the configuration of the pressure wave detecting transducers. Alternatively, the first variable may be a signal disposed along any type of delay line, in which case the second variable is represented by the configuration of the appropriate detecting means. The magnetic recording case described above is a particular example of this, while electrostatic recording on thermoplastic tape is another similar example.

The normal types of delay line operate in one effective dimension only, but the cases of electromagnetic waves in space, pressure waves in fluids and elastic waves of all types in solids may exist in three dimensions. It will be understood that if the transmitter is emitting periodic or swept-frequency signals which subsequently undergo circular, cylindrical or spherical spreading, the type of detecting means described above (where the individual detectors are arranged in space according to the distribution of the transmitted signal along a praticular trajectory in space) is highly directional. If the transmitted signal is periodic, the direction-finding capabilities of this signal are restricted to the measurement of amplitude of the detected signal. However, when the transmitted signal is a swept-frequency, the direction information is implicit in the form of the cross-correlation function and this is a more sensitive indication.

While the present invention has been described in connection with the details of particular embodiments thereof, it should be understood that these details are not intended to be limitative of the invention since many modifications will be readily apparent to those skilled in this art.

What is claimed as new and desired to be secured by Letters Patent of the United States is:

1. An apparatus for correlating two variables comprising:
   a magnetizable medium upon which a first of said variables is recorded;
   a magnetic field produced in the vicinity of the magnetizable medium having a spatial distribution corresponding to said first variable;
   a detector including a plurality of individual detecting elements spaced apart as a function of the second variable, said detector comprising a plurality of groups of turns of an insulated conductor, the turns of each group being closely spaced and the different groups being spaced apart as a function of the second variable;
   means for moving said medium past and directly adjacent the surface of said detector whereby said magnetic field induces electrical signals in said detecting elements having an amplitude proportional to the effect of the magnetic field; and
   means for combining the electrical signals from the detecting elements to determine the correlation between the two variables.

2. The apparatus defined by claim 1 wherein the number of turns in each group varies as a function of the wavelength of the second variable.

3. The apparatus defined by claim 1 wherein said groups of turns are wound upon a support, the different groups of turns being spaced apart longitudinally of said support, the groups being formed by a continuous conductor wound about said support in a first direction proceeding from end to end and then wound about said support in the opposite direction to form detector elements comprising interleaved groups of turns wound in opposite senses.

4. The apparatus defined by claim 2 wherein said groups of turns are wound upon a support, the different groups of turns being spaced apart longitudinally of said support, the groups being formed by a continuous conductor wound about said support in a first direction proceeding from end to end and then wound about said support in the opposite direction to form detector elements comprising interleaved groups of turns wound in opposite senses.

5. The apparatus defined by claim 1 wherein the turns of each group have a spacing therebetween determined by the wave shape of a predetermined portion of the second variable.

6. The apparatus defined by claim 3 wherein the turns of each group have a spacing therebetween determined by the wave shape of a predetermined portion of the second variable.

7. A method for correlating first and second variables which includes the steps of recording the first variable as an energy distribution on a magnetic record; forming a longitudinally extending transducer having a transducer element arranged in a configuration which corresponds to the second variable on the same time scale as used for recording the first variable; relatively moving the record and the transducer longitudinally with respect to and in coupling relation to each other to induce voltages in said transducer element as a result of the effect of the energy distribution; indicating the amplitudes of the induced voltages whereby the indication is proportional to the correlation of the two variables over the length of the transducer; and varying the coupling between said record and said transducer to effect frequency selective filtering of voltages induced in said transducer element.

8. The method defined by claim 7 wherein the step of varying coupling between the record and the transducer is carried out by moving the record away from the transducer.

9. The method defined by claim 7 wherein the step of varying the coupling between the record and the transducer is carried out by inserting a shield between the record and the transducer to reduce the coupling therebetween.

10. A method for correlating first and second variables which includes the steps of recording the first variable as an energy distribution on a magnetic tape; forming a longitudinally extending transducer having a transducer element arranged in a configuration corresponding to the second variable on the same time scale as used for recording the first variable; moving said tape over the transducer in a direction extending longitudinally of the transducer in coupling relation thereto to cause voltages to be induced in said transducer element; indicating the amplitude of the induced voltages whereby the indication is proportional to the correlation of the two variables along the length of the transducer; and varying the coupling between said record and said transducer to effect frequency selective filtering of the voltages induced in said transducer element.

11. The method defined by claim 10 wherein step of varying the coupling between the tape and the transducer is carried out by moving the tape away from the transducer in a direction that is normal to the surface of the transducer.

12. The method defined by claim 10 wherein the step of varying the coupling between the tape and the transducer is carried out by inserting a shield therebetween in order to reduce the coupling.

13. A method for correlating first and second variables which includes the steps of recording the first variable as an energy distribution on a magnetic record; forming a longitudinally extending transducer having a transducer element made up of individual detectors connected in series and arranged in a configuration corresponding to the second variable on the same time scale as used for recording the first variable, but with at least some of the detectors shifted in a direction extending longitudinally of the transducer in order to introduce a phase shift in the voltages induced in these particular detectors; relatively moving the record and the transducer longitudinally with respect to and in coupling relation to each other to induce voltages in the detectors of said transducer element as a result of the effect of the record energy distribution; and measuring the amplitude of the induced voltages to indicate signal correlation.

14. The method defined by claim 13 which includes the additional step of varying the coupling between the record and the transducer to effect frequency selective filtering of the voltages induced in the detectors of said transducer element.

15. The method defined by claim 14 wherein the step of varying the coupling between the record and the transducer is carried out by relatively moving the record and the transducer in a direction extending normal to the surface of the transducer.

16. The method defined by claim 14 wherein the step of varying the coupling between the record and the transducer is carried out by inserting a shield between the record and the transducer to reduce the coupling therebetween.

17. A method for correlating first and second electrical signals which includes the steps of recording the first signal on magnetic tape, forming a longitudinally extending transducer having a transducer element made up of series connected detectors arranged in a configuration corresponding to the second signal on the same time scale as used for recording the first signal but with at least some of the detectors shifted in a direction extending longitudinally of the transducer in order to introduce a phase shift in the voltages induced in these particular detectors, moving said tape past said transducer in a direction extending longitudinally thereof and in coupling relation thereto in order to induce voltages in the detectors of said transducer element, and measuring the algebraic sum of the voltages induced in the detectors in order to indicate signal correlation.

18. The method defined by claim 17 including the additional step of varying the coupling between said tape and said transducer to effect frequency selective filtering of the voltages induced in the detectors.

19. The method defined by claim 18 wherein the step of varying the coupling between the tape and the transducer is carried out by moving the tape away from the transducer in a direction extending normal to the surface of the transducer.

20. The method defined by claim 18 wherein the step of varying the coupling between the tape and the transducer is carried out by inserting a shield therebetween to reduce the coupling.

21. A method of filtering comprising the steps of forming a reference pattern made up of detecting elements spaced predetermined distances apart and representing a predetermined wavelength pattern, forming a magnetic test pattern from a signal to be filtered, relatively moving the reference pattern and the test pattern with respect to each other and at the same time subjecting the reference pattern to the influence of the test pattern to obtain from the detecting elements an output representing the correlation between the reference pattern and the test pattern, said output being dependent on the relationship between the wavelength pattern of the test pattern and said predetermined wavelength pattern.

22. The method defined by claim 21 wherein the step of forming the test pattern is carried out by recording said signal upon a magnetic recording medium which is moved past and compared to the reference pattern.

23. A method according to claim 21 wherein the reference pattern is produced by forming a continuous conductor representing the waveform of said predetermined wavelength pattern on an elongated insulating base.

24. A method according to claim 21 wherein the reference pattern is produced by winding a plurality of spaced apart turns of a continuous conductor about an elongated coil form.

25. A method according to claim 24 wherein the winding step is accomplished by arranging the conductor turns in spaced apart groups with each group acting as a detecting element, the numbers of turns in each group being varied as a function of different wavelengths of the predetermined wavelength pattern.

26. A method according to claim 24 wherein the winding is accomplished by first winding a plurality of spaced apart groups of conductor turns about said coil form in a direction extending from one end of said form to the other end and by then winding other groups of spaced apart turns about said coil form in a direction extending from said other end to said one end, each group of turns of the latter winding being interleaved between two groups of the first winding.

27. A method according to claim 26 wherein the two winding steps are accomplished by varying the number of conductor turns of the groups of both windings as a function of different wavelengths of said predetermined wavelength patten.

28. A method according to claim 21 wherein the predetermined wavelength pattern is a linear swept frequency and wherein the step of forming the reference pattern is carried out by arranging said detecting elements in a pattern representing the swept frequency.

29. A method according to claim 23 wherein the continuous conductor includes portions extending transversely of the longitudinal axis of said reference pattern and wherein the step of forming the continuous conductor is carried out to produce transversely extending portions of different thickness varying as a function of the wavelength content of said predetermined wavelength pattern.

30. The method defined by claim 28 wherein the step of forming the test pattern is carried out by recording said signal upon a magnetic recording medium which is moved past and compared to the reference pattern.

31. A method according to claim 23 wherein the step of forming the continuous conductor is carried out with the amplitudes of different portions of the conductor forming the reference pattern varying to attenuate predetermined portions of the wavelength range represented by said reference pattern.

32. A method according to claim 22 comprising the further step of varying the coupling between the recording medium and the reference pattern.

33. A method according to claim 32 wherein the step of varying the coupling is accomplished by inserting a magnetic shield between at least a portion of the reference pattern and the recording medium.

34. A method according to claim 32 wherein the step of varying the coupling is carried out by moving the recording medium relative to the reference pattern in a direction transversely of the longitudinal axis of the reference pattern.

35. A method of filtering comprising the steps of forming a reference pattern made up of detecting elements spaced predetermined distances apart and representing a predetermined wavelength pattern, forming a test pattern from a signal to be filtered, relatively moving the reference pattern and the test pattern with respect to each other and at the same time subjecting the reference pattern to the influence of the test pattern to obtain from the detecting elements an output representing the correlation between the reference pattern and the test pattern, said output being dependent on the relationship between the wavelength content of the test pattern and said predetermined wavelength pattern, and varying the wavelength of the test pattern to alter the frequency components represented by said output.

36. An apparatus for correlating two variables the first of which includes repetitions of the second and is recorded magnetically upon a magnetizable medium, said apparatus comprising a detector including a plurality of individual detecting elements spaced apart as a function of the superposition of the second variable upon one or more attenuated and time shifted-versions of itself, said detecting elements being excited by said magnetic field to induce electrical signals therein having an amplitude proportional to the effect of the magnetic field, and means for combining the electrical signals from the detecting elements to produce a more sharply defined correlation function.

References Cited

UNITED STATES PATENTS 3,054,860  9/1962  Goldmark _____ 179—100.2
3,199,106  8/1965  Karr _____ 343—17.2
3,174,142  3/1965  Mallinckrodt _____ 235—181 X
3,371,196  2/1968  Lerwill et al. _____ 235—181

MALCOLM A. MORRISON, Primary Examiner

FELIX D. GRUBER, Assistant Examiner

U.S. Cl. X.R.

324—77; 340—15